United States Patent [19]
Polster et al.

[11] Patent Number: 5,746,673
[45] Date of Patent: May 5, 1998

[54] FASTENING EYE FOR A TENSIONER

[75] Inventors: Rudolf Polster, Balersdorf; Werner Schmidt, Herzogenaurach, both of Germany

[73] Assignee: Ina Waelzlager Schaeffler OHG, Herzogenaurach, Germany

[21] Appl. No.: 706,450

[22] Filed: Sep. 3, 1996

[30] Foreign Application Priority Data

Sep. 9, 1995 [DE] Germany ............... 195 33 457.4

[51] Int. Cl.⁶ .................... F16H 7/08; F16C 27/06
[52] U.S. Cl. ............... 474/101; 384/222; 474/136
[58] Field of Search .................... 474/101, 109, 474/136, 138; 384/192, 202, 215, 216, 220, 222; 248/600, 610, 634; 403/220

[56] References Cited

U.S. PATENT DOCUMENTS

| | | | |
|---|---|---|---|
| 3,316,033 | 4/1967 | Bila | 384/222 |
| 3,799,481 | 3/1974 | Anderson | 248/15 |
| 4,002,327 | 1/1977 | Damon | 267/57.1 |
| 4,765,758 | 8/1988 | O'donnell et al. | 384/222 X |
| 5,026,330 | 6/1991 | Zermati et al. | 474/138 |
| 5,405,298 | 4/1995 | Bristot | 474/136 |

FOREIGN PATENT DOCUMENTS

| | | |
|---|---|---|
| PS 9 03 762 | 2/1954 | Germany. |
| AS 10 00 645 | 1/1957 | Germany. |
| AS 10 16 067 | 9/1957 | Germany. |
| AS 11 16 261 | 11/1961 | Germany. |
| GM 19 78 055 | 2/1968 | Germany. |
| GM 77 32 948 | 2/1978 | Germany. |
| 40 39 816 C1 | 4/1992 | Germany. |
| 42 03 347 A1 | 8/1992 | Germany. |
| 42 03 449 A1 | 8/1993 | Germany. |

*Primary Examiner*—Thomas R. Hannon
*Attorney, Agent, or Firm*—Henry M. Feiereisen

[57] ABSTRACT

A tensioning eye for use in a tensioner for a traction drive, in particular a belt drive, in an internal combustion engine, includes a fastening sleeve, a bushing, and an elastic ring circumscribing the bushing for securing the bushing in a bore of the fastening sleeve. The elastic ring has opposite ends formed with radially outwardly directed flanges which are spaced from opposing end faces of the fastening sleeve and define an outer diameter which is greater than a greatest inner diameter of the recess so as to form a radial overlap.

22 Claims, 3 Drawing Sheets

FASTENING EYE FOR A TENSIONER

BACKGROUND OF THE INVENTION

The present invention refers to a tensioner for a traction drive, particularly a belt drive, for driving components of an internal combustion engine, and in particular to a tensioner of a type including a cylindrical housing in which a piston is guided for longitudinal displacement, a compression spring arranged between the housing and the piston for exerting a linear force on the traction drive, and two fastening eyes, one being positioned at the free end of the cylindrical housing and one being positioned at the free end of the piston, with each fastening eye being formed by a bushing and an elastic ring which secures the bushing in a bore of a fastening sleeve secured to the tensioner.

Tensioners of this type are fixed by a fastening eye at a point of attachment to the crankcase of an internal combustion engine and by a second fastening eye directly or indirectly to an element, particularly a tension roller, for tensioning the traction drive. The disposition of the elastic ring in the fastening eye is intended in particular for compensating misalignments of the elements between which the tensioner is arranged. Such elastic rings are subject to high mechanical loads which, in conjunction with high ambient temperatures, increase wear and thus adversely affect the operating life of the equipment.

German Pat. No. 42 03 449 describes a tensioner of this type, including a fastening eye provided with an elastic ring which is of such configuration and disposition that a disadvantageously high moment of friction is created during pivoting of the tensioner.

SUMMARY OF THE INVENTION

It is an object of the present invention to provide an improved tensioner, obviating the afore-stated drawbacks.

It is another object of the present invention to provide an improved fastening eye exhibiting a low moment of friction, effecting better compensation of misalignments, and withstanding high mechanical loads while yet permitting easy installation in a cost-efficient manner.

These objects and others which will become apparent hereinafter, are attained in accordance with the present invention, by providing the sleeve and the elastic ring of each of the two tensioning eyes in such a manner that the bore of the fastening sleeve and the outer surface area of the elastic ring are so configured as to form a central, circumferential contact zone from which a gap expands continuously in radial direction toward each end face of the sleeve, and by forming the elastic ring with radially outwardly directed flanges adjacent the end faces of the sleeve at formation of a clearance therebetween, with the flanges defining an outer diameter which is greater than the inside diameter of the bore so as to form a radial overlap.

Through the configuration of the bore wall of the fastening sleeve and the outer surface area of the elastic ring, an exclusively central, circumferential contact zone is obtained, resulting in the formation of a gap which extends with increasing radial dimension from each side of the contact zone to the opposite end faces of the fastening sleeve. This geometric configuration permits a desired compensation of significant misalignments in both directions, without experiencing impermissibly high and disadvantageous wear-promoting flexing of the fastening ring. Moreover, the formed contact zone has a positive impact on the spring rate of the elastic ring because the contact surface expands with increasing force applied to the fastening eye. A suitable geometric configuration of the contact surfaces enables a controlled influence on the damping efficiency of the elastic ring. As a consequence of the lower flexing work involved, the elastic ring is also suitable for application at higher temperatures. Advantageously, the fastening eye according to the present invention exhibits also a lower moment of friction as a result of the smaller contact zone in comparison to the conventional, fully cylindrical shape of the components involved.

To assure a defined positioning of the elastic ring in the fastening sleeve, the elastic ring is formed adjacent both end faces of the sleeve with radially outwardly oriented flanges which radially overlap the wall of the bore of the fastening sleeve and thus produce an effective safety mechanism by positive engagement. The flanges are prevented from hindering the tilting movement required for the compensation of misalignments in the tensioner by forming an axial clearance between the inner surface of the flanges and the end faces of the fastening sleeve.

The configuration of the contact zone according to the invention permits the use of more rigid materials for making the elastic ring. Such an elastic ring is resistant to high surface pressures and enables to keep required component dimensions.

In a preferred embodiment of the present invention, the fastening sleeve has a radially inwardly curved, i.e. convex, bore wall for forming a contact zone for the elastic ring, the outer surface area of which is cylindrical in shape. Alternatively, the contact zone of the elastic ring can be so formed that its outer surface area is curved or convex so as to bear, in the installed state, against a cylindrical bore wall of the fastening sleeve. Either one of these configurations leads to an effective compensation of misalignments in a cost-efficient manner.

In special cases, it may be advantageous to form both the outer surface area of the elastic ring and the bore wall surface of the fastening sleeve of convex configuration.

Preferably, the elastic ring is secured in the fastening eye so as to be prevented from executing a rotation and to make sure that a pivoting in the fastening eye is effected only between the bushing and the elastic ring. Thus, in accordance with the present invention, the outer surface area of the elastic ring is formed with at least one flattened area which extends over the entire axial length thereof and complements a corresponding bore wall section of the fastening sleeve. A variation of such a positive or form-fitting engagement is effected by providing the bushing with at least one radially outwardly projecting bead which extends over the entire axial extent of the bushing and engages in a corresponding recess of the elastic ring. Persons skilled in the art will understand that also other forms of connections may be provided to prevent the elastic ring from executing a rotation, such as e.g. a force-locking engagement through an interference fit and/or gluing between these two elements.

According to another feature of the present invention, a mounting clearance is provided between the outer surface area of the bushing and the bore wall of the elastic ring. This clearance is particularly advantageous if the elastic ring is made of a high-strength material. The mounting clearance which is also required for reasons of tolerance, simplifies the installation and has a positive impact on the operating life of the elastic ring and the fastening eye as a whole. Suitably, the elastic ring is positionally secured to the bushing through a positive or interlocking engagement to effect a safeguard against loss while still allowing a rotation of the bushing relative to the elastic ring.

The positive engagement between the bushing and the elastic ring can be implemented by forming the bore wall of the elastic ring with a central, radially inwardly directed bead which, engages, in the installed state, in a circumferential groove of the bushing. Alternatively, it is certainly also feasible to provide the bushing with a radially outwardly oriented bead for engagement in an annular groove of the elastic ring.

Preferably, the bushing is made of steel or aluminum or any other suitable material that satisfies the strength requirements.

According to another feature of the invention, the elastic ring is made of a material which can withstand high mechanical loads. Examples of materials include plastic material such as polyamide. e.g. PA 46and glass-fiber reinforced PA 66. These materials possess not only a high pressure resistance and wear resistance but also a high heat resistance and are therefore particularly suitable for making elastic rings for fastening eyes of tensioners used in internal combustion engines.

BRIEF DESCRIPTION OF THE DRAWING

The above and other objects, features and advantages of the present invention will now be described in more details with reference to the accompanying drawing in which.

DETAILED DESCRIPTION OF PREFERRED EMBODIMENTS

Figure 1:
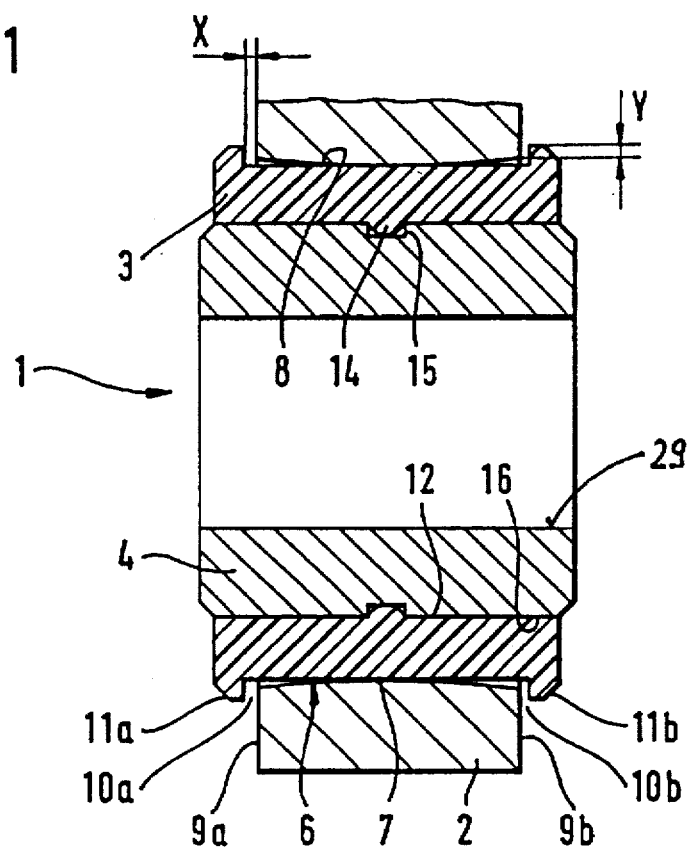
FIG. 1 is a sectional view of one embodiment of a fastening eye according to the present invention, including one variation of an elastic ring.

Throughout all the Figures, the same or corresponding elements are always indicated by the same reference numerals.

Figure 3:
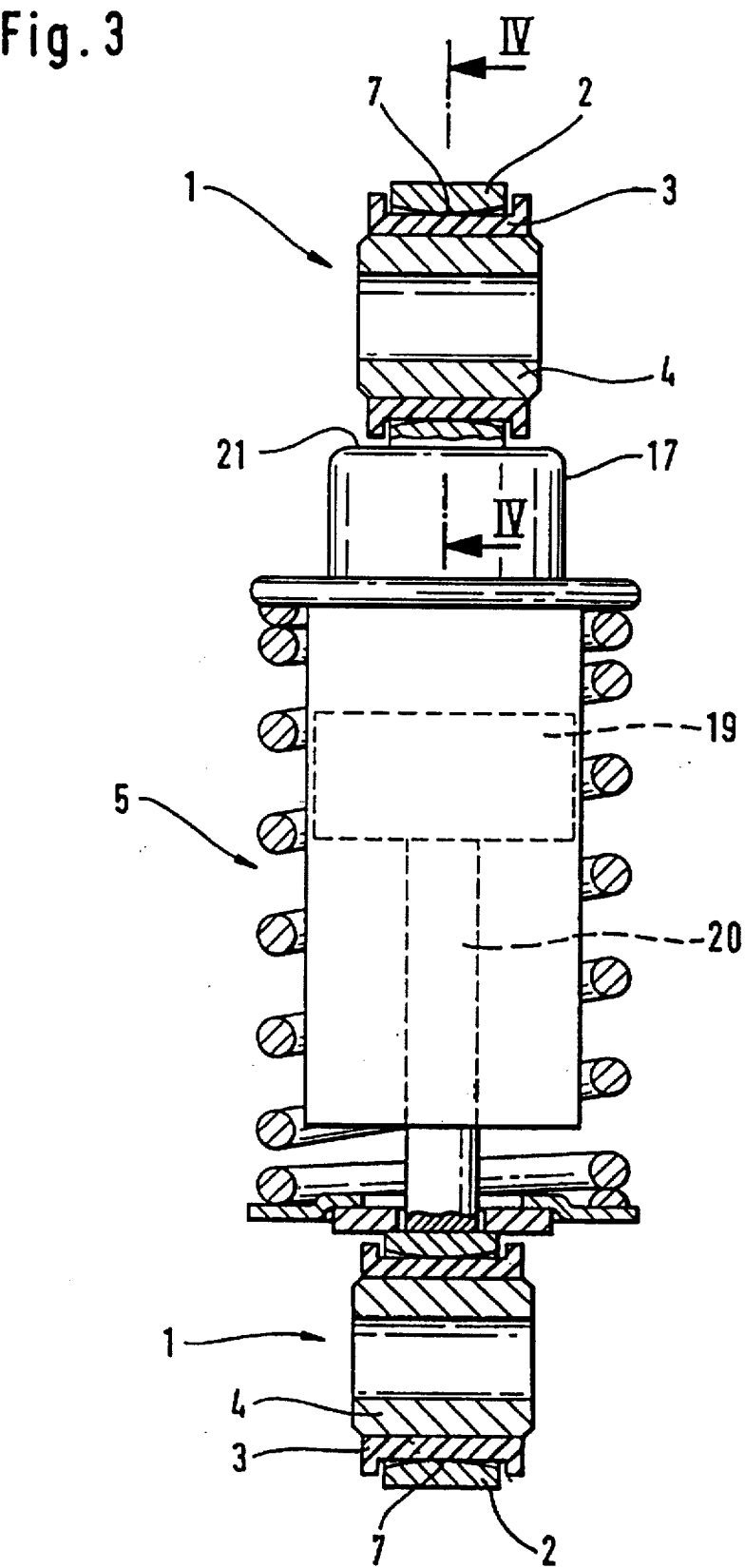
FIG. 3 is a sectional view of a tensioner equipped with fastening eyes according to the present invention.

Turning now to the drawing, and in particular to FIG. 1, there is shown a sectional view of one embodiment of a fastening eye according to the present invention, generally designated by reference numeral 1 and connected to a tensioner, generally designated by reference numeral 5 and shown in more detail in FIG. 3. The fastening eye 1 includes a fastening sleeve 2 which defines a bore 6 for receiving an elastic ring 3. The elastic ring 3 circumscribes coaxially a bushing 4 which has a central bore 29 for attachment of an element of the traction drive.

The bore 6 of the sleeve 2 is of radially inwardly directed convex configuration so as to form a central circumferential contact zone 7. A cylindrical outer surface area 8 of the elastic ring 3 bears against the fastening sleeve 2 solely along this contact zone 7. The convex or curved configuration of the bore 6 leads on both sides of the contact zone 7 to the formation of a gap 10a, 10b which extends from the contact zone 7 to widen continuously in radial dimension towards the end faces 9a, 9b of the sleeve 2. The gaps 10a, 10b enable a desired, unobstructed tilting capability of the fastening eyes 1 to compensate misalignments of the elements of the traction drive between which the tensioner 5 is positioned.

Figure 2:
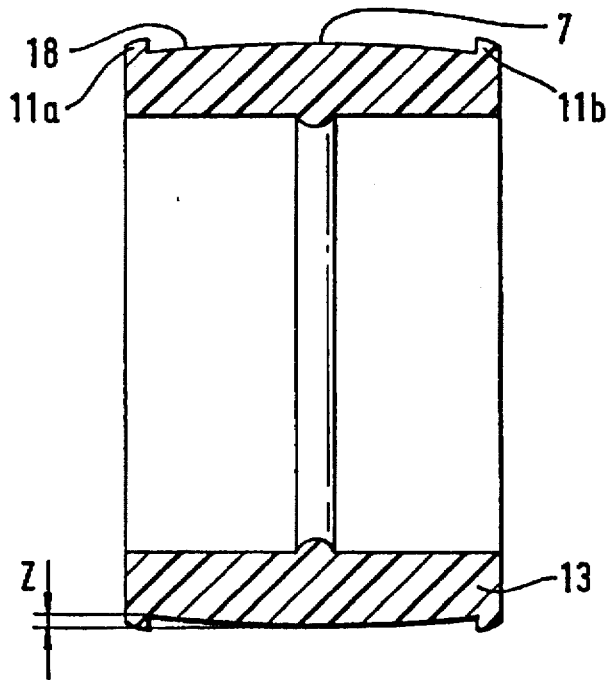
FIG. 2 is a sectional view of a modified elastic ring for use with a fastening eye according to the present invention.

As best seen in FIG. 2, the elastic ring 3 has opposite end faces formed with radially outwardly oriented flanges 11a, 11b to assure a positional securement of the elastic ring 3 relative to the sleeve 2. The flanges 11a, 11b define an outer diameter which is greater than the inside diameter of the bore 6 so that an overlap Y is obtained. Suitably, the flanges 11a, 11b are spaced at an axial distance X from the end faces 9a, 9b of the sleeve 2 so as to keep the flanges 11a, 11b from interfering with the tilting capability of the fastening eye 1.

The elastic ring 3 is preferably made of a relatively rigid material. For reasons of assembly and tolerance, the use of more rigid material necessitates the provision of a radial clearance between the inside wall surface 12 of the elastic ring 3 and an outer surface area 16 of the bushing 4. This mounting clearance ensures that a tilting of the tensioner 5 is executed only by the fastening eye 1 through rotation between the rigidly fixed bushing 4 and the elastic ring 3. To establish a positive or interlocking safety engagement with the bushing 4, the elastic ring 3 is formed with a central, radially inwardly oriented circumferential bead 14 which, in the installed state, locks into an annular groove 15 of the bushing 4. Thus, the elastic ring 3 is secured to the bushing 4 while yet allowing a rotation between these components.

FIG. 2 shows a modified configuration of an elastic ring 13 which differs from the elastic ring 3 of FIG. 1 by a convexly-shaped outer surface area 18. Reference character Z designates the difference in dimension between greatest and smallest diameter of the outer surface area 18 to thereby illustrate the convex configuration of the outer surface area 18. The contact zone 7 is formed in this case in the region of greatest diameter of the outer surface area 18.

The tensioner 5 shown in FIG. 3 is equipped with two fastening eyes 1 according to the present invention and includes a cylindrical housing 17 in which a piston 19 is guided for longitudinal displacement. The piston 19 is formed with a piston rod 20 that extends through and beyond the housing 17 and is connected at its piston-distal end to one of the fastening eyes 1. The other fastening eye 1 is connected to a bottom 21 of the cylindrical housing 17. Persons skilled in the art will understand that the structure and function of tensioners of this type are generally known per se so that a further description thereof is omitted for sake of simplicity.

Figure 4:
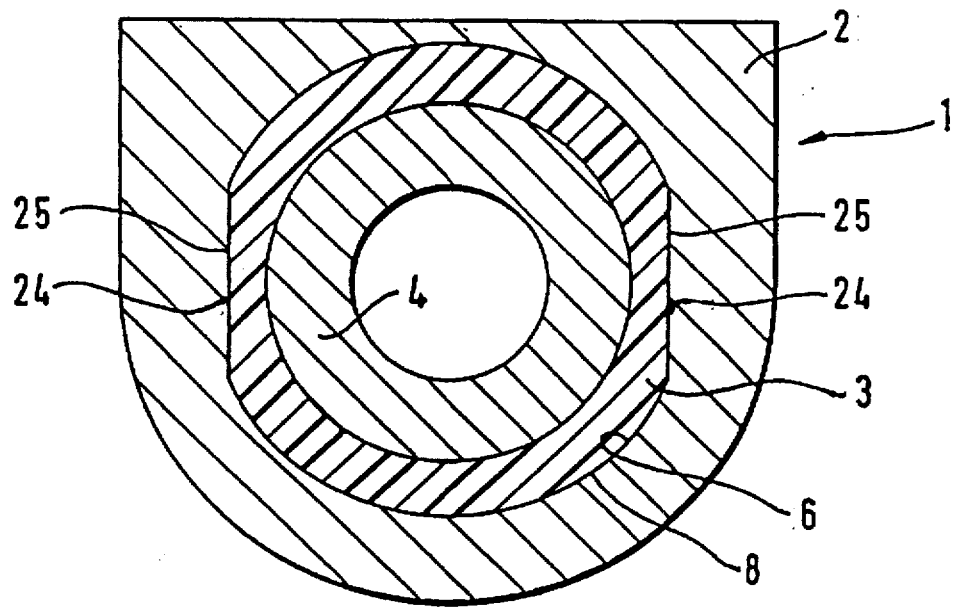
FIG. 4 is a sectional view of the fastening eye, taken along line IV—IV of FIG. 3 and illustrating in more detail a safeguard mechanism for preventing a rotation of the elastic ring relative to the sleeve.

FIG. 4 shows a sectional view of the fastening eye 1, taken along line IV—IV of FIG. 3 through the center of the elastic ring 3 in the region of the contact zone 7 and illustrating in more detail a safeguard mechanism for preventing a rotation of the elastic ring 3 relative to the sleeve 2. As shown in FIG. 4, the outer surface area 8 of the elastic ring 3 is formed with two flattened areas 25 on opposite side to one another. The flattened areas 25 are positioned coextensively upon complementary flattened areas 24 formed on the inside wall surface of the sleeve bore 6. Thus, the elastic ring 3 is prevented from rotating relative to the sleeve 2 while ensuring that a pivoting of the tensioner 5 is effected through rotation within the fastening eye 1 only between the bushing 4 and the elastic ring 3.

Figure 5:
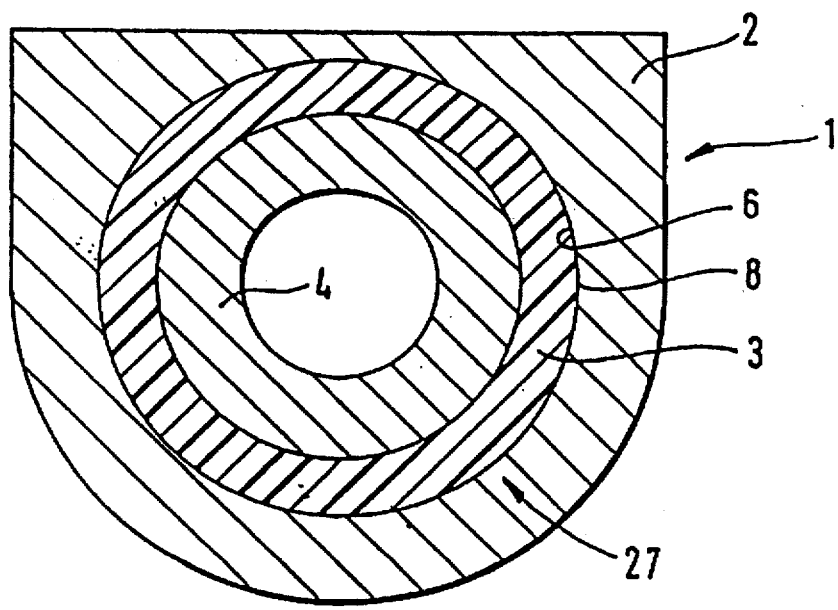
FIG. 5 is a sectional view of the fastening eye, illustrating a variation of the safeguard mechanism for preventing a rotation of the elastic ring relative to the sleeve.

FIG. 5 is a sectional view of the fastening eye 1, illustrating a variation of the safeguard mechanism for preventing a rotation of the elastic ring 3 relative to the sleeve 2, and it can be seen from FIG. 5 that the elastic ring 3 and the sleeve 2 are each of complementary, fully cylindrical geometric configuration, whereby a relative rotation between the elastic ring 3 and the sleeve 2 is prevented by gluing the outer surface area 8 of the elastic ring 3 to the inside wall surface of the sleeve bore 6. Alternatively, the elastic ring 3 may also be press-fitted into the bore 6 of the fastening sleeve 2.

While the invention has been illustrated and described as embodied in a fastening eye for a tensioner, it is not intended to be limited to the details shown since various modifications and structural changes may be made without departing in any way from the spirit of the present invention.

What is claimed as new and desired to be protected by Letters Patent is set forth in the appended claims:

1. A tensioning device for a traction drive in an internal combustion engine, comprising a tensioner of a type having a cylindrical housing; a piston means received in the housing for reciprocating in a longitudinal direction; a compression spring extending between the housing and the piston for exerting a linear force on the traction drive; and two tensioning eyes with one tensioning eye secured to one end of the housing, and the other tensioning eye secured to one end of the piston means, each of the tensioning eyes comprising:

a fastening sleeve for attachment to the tensioner, a bushing, and an elastic ring securing the bushing in a bore of the sleeve and defining an outer surface area, said bore of the sleeve and said outer surface area of the elastic ring being so configured as to form a central, circumferential contact zone from which a gap expands continuously in radial direction toward each end face of the sleeve, said elastic ring having opposite ends formed with radially outwardly directed flanges which define an outer diameter and are spaced from the end faces of the sleeve by an axial distance, said bore of the sleeve being defined by an inside diameter, wherein the outer diameter of the flanges is greater than the inside diameter of the bore so as to form a radial overlap.

2. The tensioning device of claim 1 wherein the bore of the fastening sleeve is of radially inwardly curved or convex configuration, with the outer surface area of the elastic ring bearing upon the bore in force-locking manner.

3. The tensioning device of claim 1 wherein the bore of the fastening sleeve is of cylindrical configuration and the outer surface area of the elastic ring is of convex shape and bears against the bore.

4. The tensioning device of claim 1 wherein the outer surface area of the elastic ring and the bore of the fastening sleeve are both convex in shape.

5. The tensioning device of claim 1 wherein the elastic ring is received in the fastening sleeve and prevented therein from rotating relative to the sleeve.

6. The tensioning device of claim 5 wherein the outer surface area of the elastic ring is formed with a flattened area which extends over an axial length of the elastic ring, said bore of the fastening sleeve exhibiting a configuration complementing the configuration of the outer surface area.

7. The tensioning device of claim 1 wherein the elastic ring is made of a plastic material exhibiting high mechanical strength properties.

8. The tensioning device of claim 7 wherein the elastic ring is made of polyamide.

9. The tensioning device of claim 8 wherein the elastic ring is made of polyamide selected from the group consisting of PA 46 and glass-fiber reinforced PA 66.

10. A tensioning device for a traction drive in an internal combustion engine, comprising a tensioner of a type having a cylindrical housing; a piston means received in the housing for reciprocating in a longitudinal direction; a compression spring extending between the housing and the piston for exerting a linear force on the traction drive; and two tensioning eyes with one tensioning eye secured to one end of the housing, and the other tensioning eye secured to one end of the piston means, each of the tensioning eyes comprising:

a fastening sleeve for attachment to the tensioner, a bushing exhibiting an outer surface area, and an elastic ring attached to the bushing in form-fitting manner and securing the bushing in a bore of the sleeve, said elastic ring exhibiting an inner surface area positioned adjacent the outer surface area of the bushing at formation of a clearance between the inner surface area of the elastic ring and the outer surface area of the bushing.

11. The tensioning device of claim 10 wherein the inner surface area of the elastic ring is formed with a central, radially inwardly directed bead which is engageable in a circumferential groove of the bushing.

12. The tensioning device of claim 10 wherein the elastic ring is made of a plastic material exhibiting high mechanical strength properties.

13. The tensioning device of claim 12 wherein the elastic ring is made of polyamide.

14. The tensioning device of claim 13 wherein the elastic ring is made of polyamide selected from the group consisting of PA 46 and glass-fiber reinforced PA 66.

15. A tensioning eye for use in a tensioner for a traction drive in an internal combustion engine, comprising:

a fastening sleeve for attachment to the tensioner;

a bushing; and an elastic ring circumscribing the bushing for securing the bushing in a bore of the fastening sleeve and having opposite ends formed with radially outwardly directed flanges which are spaced from adjoining end faces of the fastening sleeve and define an outer diameter which is greater than a greatest inner diameter of the bore so as to radially overlap the fastening sleeve.

16. The tensioning eye of claim 15 wherein the bore of the fastening sleeve is of radially inwardly curved or convex configuration, said elastic ring being fitted within the bore of the sleeve in force-locking manner.

17. The tensioning eye of claim 15 wherein the bore of the fastening sleeve is of cylindrical configuration and the elastic ring has an outer surface area exhibiting a convex shape and bearing against the bore.

18. The tensioning eye of claim 15 wherein the elastic ring has an outer surface area, said bore of the fastening sleeve and the outer surface area of the elastic ring are each convex in shape.

19. The tensioning eye of claim 15 wherein the elastic ring has an outer surface area formed with a flattened area which extends over an axial length of the elastic ring, said bore of the fastening sleeve exhibiting a configuration complementing the configuration of the outer surface area.

20. The tensioning eye of claim 15 wherein the elastic ring is made of a material selected from the group consisting of polyamide, PA 46 and glass-fiber reinforced PA 66.

21. The tensioning eye of claim 15 wherein the elastic ring circumscribes the bushing at formation of a clearance between the elastic ring and the bushing.

22. The tensioning eye of claim 15 wherein the elastic ring has an inner surface area formed with a central, radially inwardly directed bead which is engageable in a circumferential groove of the bushing.

* * * * *